US011341103B2

(12) United States Patent
Basham et al.

(10) Patent No.: US 11,341,103 B2
(45) Date of Patent: May 24, 2022

(54) REPLICATING AND MIGRATING FILES TO SECONDARY STORAGE SITES (71) Applicant: INTERNATIONAL BUSINESS MACHINES CORPORATION, Armonk, NY (US)

(72) Inventors: Robert B. Basham, Beaverton, OR (US); Anbazhagan Mani, Bangalore (IN); Rishika Kedia, Bangalore (IN); Harold J. Roberson, II, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 395 days.

(21) Appl. No.: 15/669,319

(22) Filed: Aug. 4, 2017

(65) Prior Publication Data
US 2019/0042595 A1    Feb. 7, 2019

(51) Int. Cl.
G06F 16/182    (2019.01)
G06F 16/16    (2019.01)
(Continued)

(52) U.S. Cl.
CPC ........ G06F 16/1844 (2019.01); G06F 16/119 (2019.01); G06F 16/162 (2019.01); G06F 16/178 (2019.01)

(58) Field of Classification Search
CPC .... G06F 16/162; G06F 16/178; G06F 16/119; G06F 16/1844
See application file for complete search history.

(56) References Cited
U.S. PATENT DOCUMENTS 7,346,664 B2 * 3/2008 Wong ...................... H04L 29/06
709/214
7,657,581 B2 * 2/2010 Orenstein ............... G06F 16/27
707/661
(Continued)

FOREIGN PATENT DOCUMENTS

CN    106250320 A    12/2016
CN    106570093 A    4/2017
CN    106855834 A    6/2017

OTHER PUBLICATIONS

G. Delaval, et al., "Modular Coordination Multiple Autonomic Managers", CBSE'14, Jun. 30-Jul. 4, 2014, Marcq-en-Baroeul, France, ACM, 2014, pp. 10.
(Continued)

Primary Examiner — Miranda Le
(74) Attorney, Agent, or Firm — Konrad Raynes Davda & Victor LLP; David W. Victor (57) ABSTRACT Provided are a computer program product, system, and method for replicating and migrating files to secondary storage sites. Files in a fileset at the primary storage site are migrated to a file container, wherein data for the files migrated to the file container is distributed among the secondary storage sites. File metadata for each of the migrated files is updated to include access information on the migrated file in the file container. Data for the migrated files is deleted in a local storage. The file metadata for the migrated files is replicated to the secondary storage sites over the network to store in filesets at the secondary storage sites without replicating file data for the migrated files to store in the filesets the secondary storage sites.

21 Claims, 8 Drawing Sheets (51) Int. Cl.
*G06F 16/11* (2019.01)
*G06F 16/178* (2019.01)

(56) References Cited

U.S. PATENT DOCUMENTS

| | | | |
|---|---|---|---|
| 8,112,395 B2* | 2/2012 | Patel | G06F 16/10 707/636 |
| 8,166,038 B2* | 4/2012 | Kaufman | G06F 16/907 707/738 |
| 8,442,957 B2* | 5/2013 | Saake | G06F 16/113 707/694 |
| 8,682,955 B1 | 3/2014 | Monden et al. | |
| 8,725,689 B1* | 5/2014 | Koryakina | G06F 16/128 707/639 |
| 8,892,611 B2* | 11/2014 | Jensen | G06F 3/0613 707/821 |
| 8,918,478 B2* | 12/2014 | Ozzie | G06F 11/1004 709/217 |
| 8,954,381 B1 | 2/2015 | Naamad | |
| 9,081,842 B1 | 7/2015 | Natanzon et al. | |
| 9,313,270 B2* | 4/2016 | Joshi | G06F 16/27 |
| 9,430,387 B2 | 8/2016 | Vekiarides et al. | |
| 9,552,217 B2 | 1/2017 | Tarasuk-Levin et al. | |
| 9,665,428 B2* | 5/2017 | Vairavanathan | G06F 3/06 |
| 2004/0236798 A1* | 11/2004 | Srinivasan | H04L 67/1097 |
| 2006/0069887 A1 | 3/2006 | LeCrone et al. | |
| 2006/0161746 A1* | 7/2006 | Wong | G06F 11/1662 711/162 |
| 2007/0136308 A1* | 6/2007 | Tsirigotis | G06F 16/122 |
| 2010/0094958 A1* | 4/2010 | Zuckerman | H04L 67/1002 709/219 |
| 2011/0231477 A1 | 9/2011 | Safruti et al. | |
| 2011/0238621 A1* | 9/2011 | Agrawal | G06F 16/273 707/610 |
| 2012/0016838 A1* | 1/2012 | Arai | G06F 3/0611 707/610 |
| 2012/0101995 A1* | 4/2012 | Agetsuma | G06F 3/0605 707/644 |
| 2012/0150799 A1* | 6/2012 | Matsuzawa | G06F 16/185 707/622 |
| 2012/0284317 A1* | 11/2012 | Dalton | G06F 16/13 707/827 |
| 2013/0024421 A1* | 1/2013 | Shinohara | G06F 3/0608 707/622 |
| 2014/0181441 A1* | 6/2014 | Kottomtharayil | G06F 3/0613 711/162 |
| 2015/0088821 A1 | 3/2015 | Blea et al. | |
| 2016/0253398 A1* | 9/2016 | Jothivelavan | G06F 16/184 707/634 |
| 2017/0077950 A1* | 3/2017 | Pavlov | H03M 13/611 |

OTHER PUBLICATIONS

"IBM Spectrum Scale Version 4 Release 2.2", IBM Corporation, Document GA76-0441-12, 2017, pp. 384.

"Erasure Code Support", Erasure Code Support—swift 2.14.1 dev119 documentation, [online][retrieved Jul. 1, 2017] https://docs.openstack.org/developer/swift/overview_erasure_code.html, pp. 12.

P. Luse, Sr., et al., "Swift Object Storage: Adding Eraser Codes", Sep. 2014, SNIA Education, pp. 36.

K.Tsuyuzaki, et al., "Recent Activities Involving OpenStack Swift", NTT Technical Review, Regular Articles, vol. 13 No. 12 Dec. 2015, pp. 6.

A. Patil, et al., "Cloud Object Storage as a Service IBM Cloud Object Storage from Theory to Practice", IBM Corporation, Document SG24-8385-00, Mar. 2017, pp. 290.

T. Pearson, "1367 IBM Cloud Object Storage System (powered by Cleversafe) and its Applications", IBM Corporation, EDGE 2016, pp. 47.

PCT International Search Report an Written Opinion dated Dec. 12, 2018, for Application No. PCT/IB2018/055714, pp.

English machine translation for Chinese Patent No. CN10250320A, filed Dec. 21, 2016, pp. 19.

English machine translation for Chinese Patent No. CN106570093A, filed Apr. 19, 2017, pp. 6.

English machine translation for Chinese Patent No. CN106855834A, filed Jun. 16, 2017, pp. 20.

* cited by examiner

REPLICATING AND MIGRATING FILES TO SECONDARY STORAGE SITES

BACKGROUND OF THE INVENTION

1. Field of the Invention

The present invention relates to a computer program product, system, and method for replicating and migrating files to secondary storage sites.

2. Description of the Related Art

Disaster recovery systems mirror filesets of data from a primary site to one or more secondary sites. In the event of a failure at a primary site, read and write requests from connected hosts can be redirected to the secondary sites. Further, systems in a network may implement cloud tiering where files are transferred to cloud object storage to make space on the local storage, such as International Business Machines Corporation (IBM) Cloud Object Storage System™, AWS® S3 Services, OpenStack® Swift. (CLOUD OBJECT STORAGE is a trademark of IBM, AWS is a trademark of Amazon Web Services, OpenStack is a trademark of The OpenStack Foundation). After the cloud tiering, only stubs will be present on the file system. When the stubs are accessed, the file represented by the accessed stubs are transparently recalled.

Described embodiments provide improved techniques for maintaining redundant copies of data at secondary sites for disaster recovery purposes.

SUMMARY

Provided are a computer program product, system, and method for replicating and migrating files to secondary storage sites. Files in a fileset at the primary storage site are migrated to a file container, wherein data for the files migrated to the file container is distributed among the secondary storage sites. File metadata for each of the migrated files is updated to include access information on the migrated file in the file container. Data for the migrated files is deleted in a local storage. The file metadata for the migrated files is replicated to the secondary storage sites over the network to store in filesets at the secondary storage sites without replicating file data for the migrated files to store in the filesets the secondary storage sites.

With the described embodiments, when migrating a file to an object file container whose content is distributed among the primary and secondary storage sites, only the file metadata is migrated to the filesets of the secondary storage sites, not the actual file being migrated as an object to the file container. This conserves network bandwidth because multiple instances of very large files are not replicated in full to the secondary storage sites along with the file that is migrated as an object to a file container to be distributed to the secondary storage sites. Doubly replicating the file to the secondary storage sites filesets as well as migrating to a file container to be distributed across the storage sites would use a substantial amount of network bandwidth. Limiting the copying of the file to secondary storage sites to distributing one instance of each fragment of the file to the secondary storage sites conserves substantial network bandwidth by avoiding replicating the full very large file to each of the secondary storage sites. However, the much smaller file metadata is replicated to the filesets at the secondary storage sites and may be used to access the file if needed at the secondary storage sites, where the file can be recalled from the file container including the file as a distributed object.

In a further embodiment, the file metadata for the files migrated to the file container is also migrated to a metadata container distributed across the primary and the secondary storage sites. A full copy of the file metadata is migrated to the metadata container at each the secondary storage sites in response to the migrating the file metadata to the metadata container.

With this further embodiment, because the file metadata is a relatively small object, migrating a fully copy to each secondary storage site consumes very little network bandwidth. Further, the metadata format of the object having the file may not be large enough to store the full file metadata. Thus, migrating the file metadata to a metadata container, from where the file metadata object is then copied to all the secondary storage sites, provides the file metadata object for the file objects stored in the file container to be available in full if needed at the primary and secondary storage sites.

In a further embodiment, a determination is made as to whether files in the fileset have not been accessed within a threshold time so that the migrated files comprise a first group of files that have not been accessed within the threshold time. A second group of files in the fileset that have been accessed within the threshold time are pre-migrated to the file container while leaving a copy of the files in the second group in the fileset.

With the further pre-migration embodiment, files may be migrated ahead of the time they are requested to be migrated to reduce latency in completing the migration operation when needed. Further, for the pre-migration of files that do not satisfy an archive policy, the file is maintained in the fileset for access.

In a further embodiment, an update is received to one of the files in the fileset comprising an updated file. The file metadata for the updated file is updated to include information on the updated file. The file metadata for the updated file is replicated to the secondary storage sites over the network.

With the further embodiment, the file metadata for the updated file is replicated to the secondary storage sites to store with their filesets to provide the secondary storage sites access to the most current version of the file, which is reflected in the file metadata, even if the secondary storage sites do not yet have all the updated data for the updated file.

In a further embodiment, updated data of the updated file is replicated to the secondary storage sites over the network, wherein the updated data comprises changes to the updated file that is less than full content of the updated file.

With this further embodiment, only the updated data of the updated file is replicated for the filesets at the secondary storage site, without replicating the entire updated file which may be very large. This conserves network bandwidth from having to replicate a very large file to multiple secondary storage sites when only a small portion of the file is updated. This embodiment provides the secondary storage sites with a much smaller update data to make available at the secondary storage sites to access the updated file. The secondary storage sites may already have a previous version of the file in their filesets to which the updated data may be added and, if not, recall the previous version of the file from the file container to then combine with the updated data to provide the full updated file.

DETAILED DESCRIPTION

Disaster recovery systems, such as the International Business Machines (IBM) Active File Management (AFM) Asynchronous Disaster Recovery (AFM DR), perform asynchronous fileset level replication to secondary sites for disaster recovery purposes. The primary site is a read-write fileset where the applications are currently running and have read-write access to the data. The secondary site is read-only. All the data from the primary site is asynchronously synchronized with the secondary site. The primary and secondary sites can be independently created in storage and network configuration. After the sites are created a replication relationship may be established between the two filesets.

In addition to the AFM-DR asynchronous synchronization, the disaster recovery system may migrate less frequently used or "cool" files to cloud object storage. After the cloud tiering, such as the IBM Transparent Cloud Tiering, only stubs are present on the file system, and when the stubs are accessed the files are transparently recalled.

In systems that employ both replication using an asynchronous file management to copy modified files to the secondary sites and a cloud tiering to migrate less frequently used files to free up space at the primary site, there is the potential of double network traffic, i.e. double Wide Area Network (WAN) traffic, as both the asynchronous replication and cloud tiering migration transfer the same file data over the network from the primary site to the secondary sites and cloud storage site.

Described embodiments provide a technological solution to the network problem of double WAN traffic from both asynchronous replication and tiering of less frequently used files by replicating the file metadata for files in the fileset to secondary storage sites over the network for files also migrated to object storage, such as by streaming fragments of the migrated files to object storage distributed at the secondary storage sites, without copying the file to the filesets at the secondary storage sites. In this way, the file data for files that have already been migrated as objects are not additionally replicated to the secondary storage site file sets, thus reducing network traffic. The secondary storage sites may recall copies of the migrated files represented by the replicated file metadata stored as fragments in the secondary storage sites.

Figure 1:
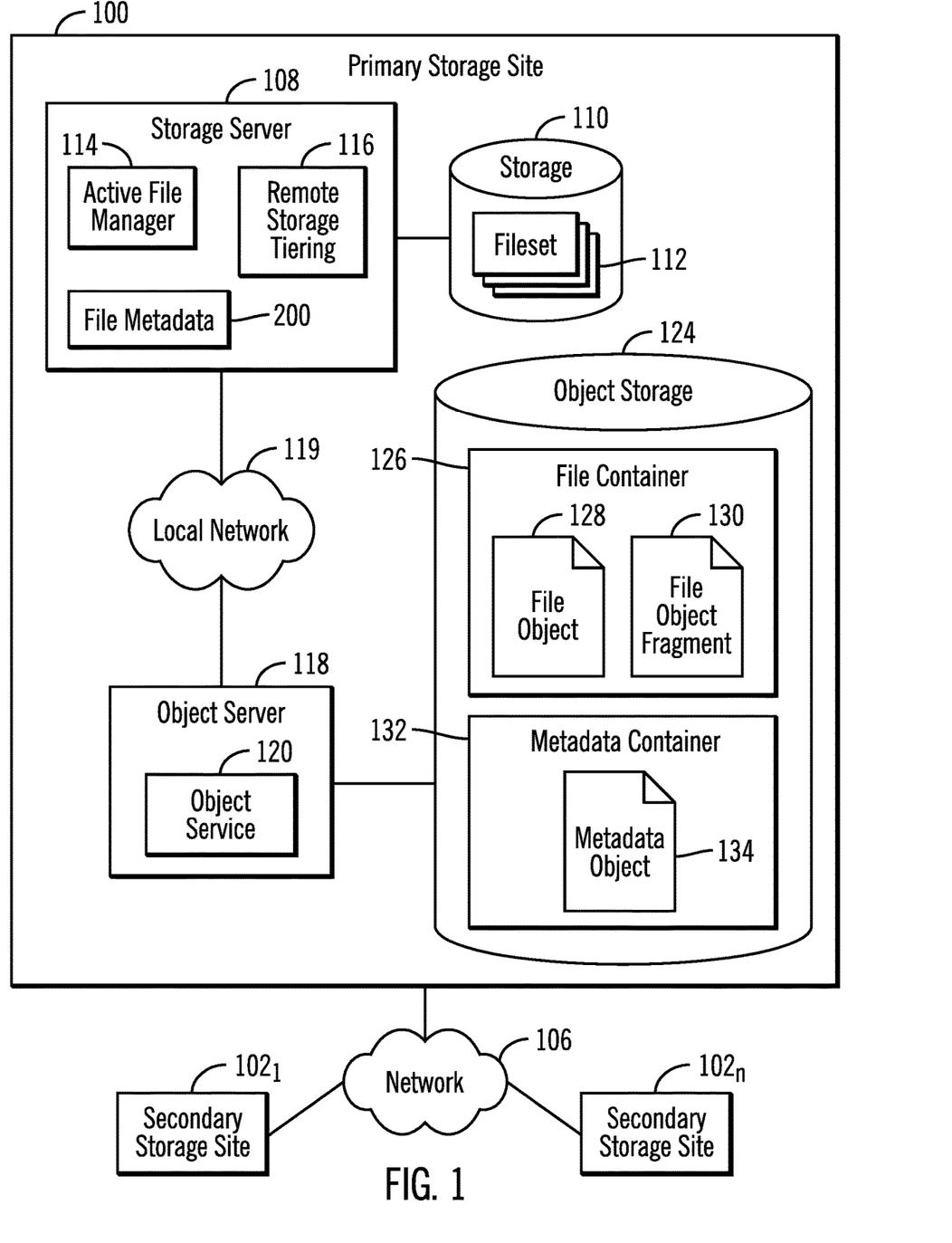
FIG. 1 illustrates an embodiment of a network storage environment.

FIG. 1 illustrates an embodiment of a data storage environment having a primary storage site 100 and secondary storage sites $102_1 \ldots 102_n$ that communicate over a network 106, such as a Wide Area Network (WAN). The primary 100 and secondary $102_1 \ldots 102_n$ storage sites may be at disparate geographical locations, so that any one of the sites can be used as an alternate if a disaster occurs at one site. Further, hosts (not shown) may direct read and writes to the primary storage site 100 and only reads to the secondary storage sites $102_1 \ldots 102_n$. In the event of a failure at the primary storage site 100, a failover may occur to one of the secondary sites which then operates as the failover primary site. The primary storage site 100 includes a storage server 108 and a storage 110 including filesets 112 that comprise a file system or partitions of a file system including files. The storage server 108 includes an active file manager 114 to manage read and write requests from connected hosts or local processes to the filesets 112 and replicate files to filesets in the file systems at the secondary storage sites $102_1 \ldots 102_n$. The active file manager 114 maintains file metadata 200 providing metadata for each file in the filesets 112. The storage server 108 further includes a remote storage tiering 116 program to migrate files as objects to object storage according to an archival policy, such as an Information Lifecycle Management (ILM) policy, to move files that satisfy certain file size and other criteria.

The secondary storage sites $102_1 \ldots 102_n$ may further include a storage server 108, and components 114, 116, 200, and storage 110 as described with respect to the primary storage site 100 to maintain a copy of the filesets 112 at the primary storage site 100.

The primary storage site 100 may communicate with an object server 118 over a local area network 119. The object server 118 includes an object service 120 to handle PUT and GET request toward containers in an object storage 124. The object storage 124 may include a file container 126 to store a file object 128 having the entire file or file object fragments 130, comprising a fragment of the entire file when the file is stored as fragments distributed across the storage sites 100, $102_1 \ldots 102_n$, and a metadata container 132 to store metadata objects 134 having the file metadata for the files stored as objects.

In certain distributed object embodiments, the containers 126 and 132 may span multiple of the sites in the network 106. The containers may be defined by a policy to store a full copy of data at each site or may be defined to fragment the data, for example using erasure coding techniques, across all sites with only part of the data at each site.

In one embodiment, the file container 126 may be defined with a file policy to encode the data for a file into fragments and then stream to the secondary storage sites $102_1 \ldots 102_n$ to store as distributed fragments. In this way, each file container 126 at the sites 100, $102_1 \ldots 102_n$ stores only a fragment 130 of the file data. The metadata container 132 may be defined with a policy to make a full copy of the file metadata objects 134 to the secondary storage sites $102_1 \ldots 102_n$. In one embodiment, the file container 126 spanning the storage sites may not store a full copy of the file object migrated to the file container 126, but just the one or more file object fragments 130 distributed among the storage sites. Alternatively, the file container 126 spanning the sites may store the full copy of the file object 128.

Each of the secondary storage sites $102_1 \ldots 102_n$ may further include their own instance of a local area network 119, object server 118, object service 120, object storage 124, an implementation of the file container 126 and metadata container 132 distributed across sites, where file object fragments 130 for a file may be stored across the secondary storage sites $102_1 \ldots 102_n$. If a request is received at one of the sites 100, $102_1 \ldots 102_n$ to a file in a fileset 112, if the file metadata $200_i$ indicates the file is not stored in the local storage 110 but instead as an object in a file container 126, then the remote storage tiering 116 in the secondary storage site $102_i$ recalls the file object from the file container 126. The file metadata 200 may comprise inodes or other types of file metadata.

In one embodiment, the object service 120 may use erasure coding to encode a file into fragments to stream to the secondary storage sites $102_1 \ldots 102_n$ based on object storage technology known in the art, such as ring locations. The file object fragments 130 may comprise data and parity fragments to allow recovery of the data fragments. In alternative embodiments, other techniques may be used to distribute object data at secondary storage sites throughout a network. The object data may be distributed across the sites such that data access and integrity is maintained even in the event of a complete loss of one or more of the sites 100, $102_1 \ldots 102_n$.

The objects 122 may comprise an unstructured data format suitable for storing large amounts of data. Further, the objects may be accessed over the network 106 using Universal Resource Locators (URLs) Hypertext Transport Protocol (HTTP) commands and Application Programming Interfaces (APIs). The objects may be stored in containers for an account. For instance, the object service 120 may implement the OpenStack Object Storage (swift) system with erasure coding support encoding object data as fragments distributed across storage nodes over the wide area network 119. The remote storage tiering 116 includes an object interface to access (GET) and transfer (PUT) file and file metadata 200, to containers 126 and 132.

The storages 110 and 124 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Data in the storages 110 and 124 may further be configured from an array of devices, such as Just a Bunch of Disks (JBOD), Direct Access Storage Device (DASD), Redundant Array of Independent Disks (RAID) array, virtualization device, etc. Further, the storages 110, 124 may comprise heterogeneous storage devices from different vendors and different types of storage devices, such as a first type of storage devices, e.g., hard disk drives, that have a slower data transfer rate than a second type of storage devices, e.g., SSDs.

The networks 106 and 119 may comprise one or more networks including Local Area Networks (LAN), Storage Area Networks (SAN), Wide Area Network (WAN), peer-to-peer network, wireless network, the Internet, etc.

Figure 2:
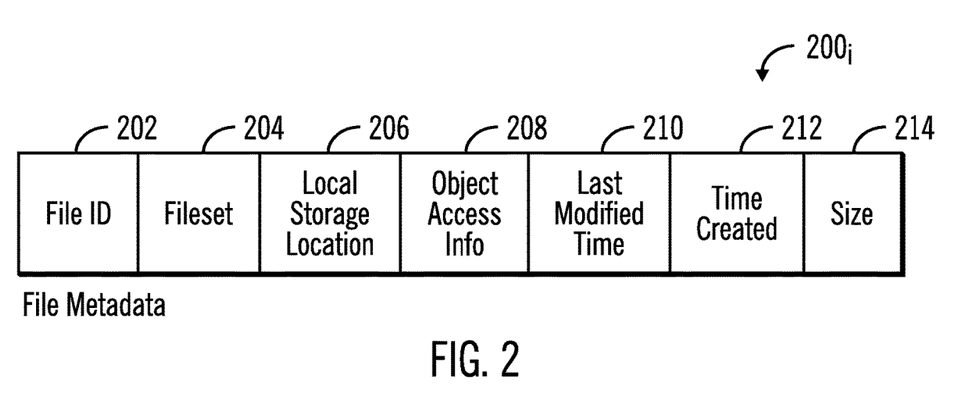
FIG. 2 illustrates an embodiment of file metadata.

FIG. 2 illustrates an instance of file metadata $200_i$ for a file including a unique file identifier 202, such as a file name; a fileset 204 including the file 202; a local storage location 206 if a copy of the file is resident in the local storage 110; object access information 208 if the file has been migrated to the file container 126, such as an object URL, container, account information, etc.; last modified time 210; time crated 212; and file size 214. The object access information 208 may further include the URL for access the metadata object 134 for the file 202.

If a file 202 has been migrated to file container 126 and a copy not maintained in the local fileset 204, then the file metadata $200_i$ for the file 202 is maintained with the fileset 112 to allow the file object 128 to be recalled from the file container 126. If a copy of the file is maintained in the fileset 112 in the local storage 110 as indicated in the local storage location 206, then the file 202 may be retrieved locally.

Figure 3:
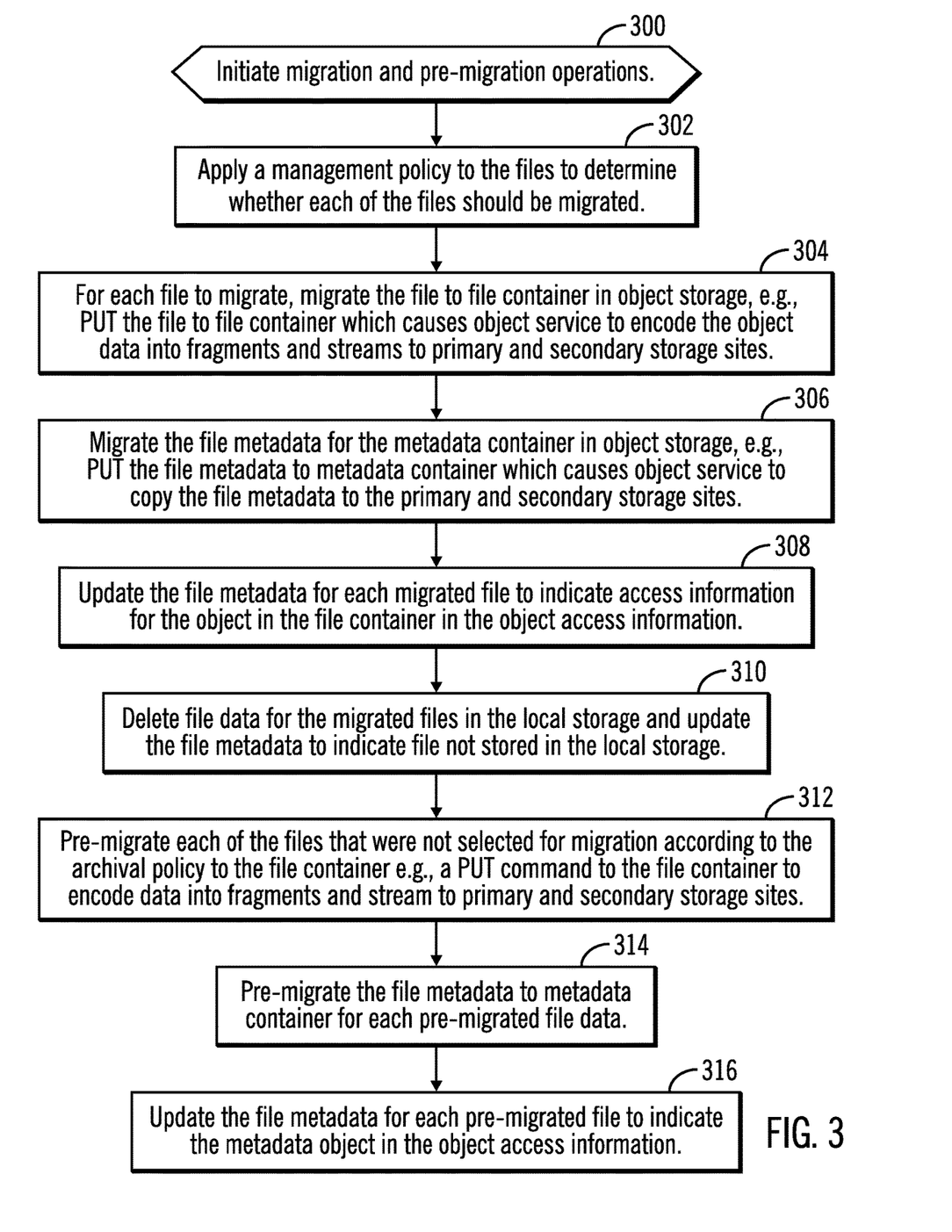
FIG. 3 illustrates an embodiment of operations to migrate and pre-migrate files.

FIG. 3 illustrates an embodiment of operations performed by the remote storage tiering 116 to migrate and pre-migrate files in a filesets 112 to a file container 126 distributed across the sites 100, $102_1 \ldots 102_n$. Upon initiating (at block 300) migration and pre-migration, the remote storage tiering 116 applies (at block 302) a management policy to the files to determine whether each of the files in the fileset 112 should be migrated. For instance, the management policy may comprise an information lifecycle management (ILM) policy that decides to archive files that have not been accessed within a threshold time. For each file to migrate according to the management policy, the file is sent to the file container 126 in object storage 124, e.g., PUT the file to the file container 126, which causes the object service 120 to apply erasure coding to encode the file data into fragments and stream the file object fragments 130 to the primary 100 and secondary storage sites $102_1 \ldots 102_n$. The file data may be substantially large, such as a large object.

The file metadata $200_1$ for each migrated file is migrated (at block 306) to the metadata container 132 in the object storage 124, e.g., PUT the file metadata $200_i$, to the metadata container 132, which causes the object service 120 to copy the file metadata as a metadata object 134 to the metadata container 132 at the primary and the secondary storage sites $102_1 \ldots 102n$. The file metadata $200_i$ is updated (at block 308) for each migrated file to indicate in the object access information 208 access information for the object in the file container 126. When the remote storage tiering 116 migrates the data for the files and file metadata $200_i$ to the object containers 126 and 132, the object service 120 may return for each object the URL and container 126, 132 in the object storage 124 including the object, and the remote storage tiering 116 may include (at block 308) this object access information in the object access information 208. After migrating the files in the objects, the file data for each of the migrated files may be deleted (at block 310) in the filesets 112 in the local storage 110 and the file metadata $200_i$ is updated to indicate that the file is not stored in the local storage 110, such as indicating no location in the local storage location 206.

After migrating files that qualify to be archived according to a migration policy, the remote storage tiering 116 may pre-migrate files not satisfying the management policy and that are to remain in the local storage 110 as part of a pre-policy migration process. The pre-migration process of the remote storage tiering 116 sends (at block 312) each of the files that were not selected for migration according to the archival policy to the file container 126, e.g., a PUT command to the file container 126, to cause the object service 120 to encode the file data into fragments 130 to then stream to the primary 100 and secondary storage sites $102_1 \ldots 102_n$. The file metadata $200_i$ for each pre-migrated file is also pre-migrated (at block 314) to the file metadata container 132, which then causes the object service 120 to make a full copy of the file metadata object 134 to the metadata container 132 at the primary 100 and the secondary storage sites $102_1 \ldots 102_n$ per the policy for the metadata container 132. The file metadata $200_i$ is updated (at block 316) for each migrated file to indicate in the object access information 208 the object in which the file is located, as described with respect to block 308. Files pre-migrated according to the process of blocks 312-316 remain in the local fileset 112 and storage 110 for fast access as they do not qualify for policy based migration, and may be frequently accessed so as to remain in local storage 110.

In certain implementations, the file metadata 200, format may not be compatible with the metadata format for the file object fragments 130 in the file container 126, such as the file metadata $200_i$ may be too large. In such case, the file metadata $200_i$ is stored in a separate metadata object 134. In an alternative embodiment, where the object metadata is in a format compatible with the file metadata $200_i$, then the migrated file metadata $200_i$ may be stored in the file object 128 and fragment 130 metadata without the need to store the file metadata $200_i$ in a separate object 122.

Figure 4:
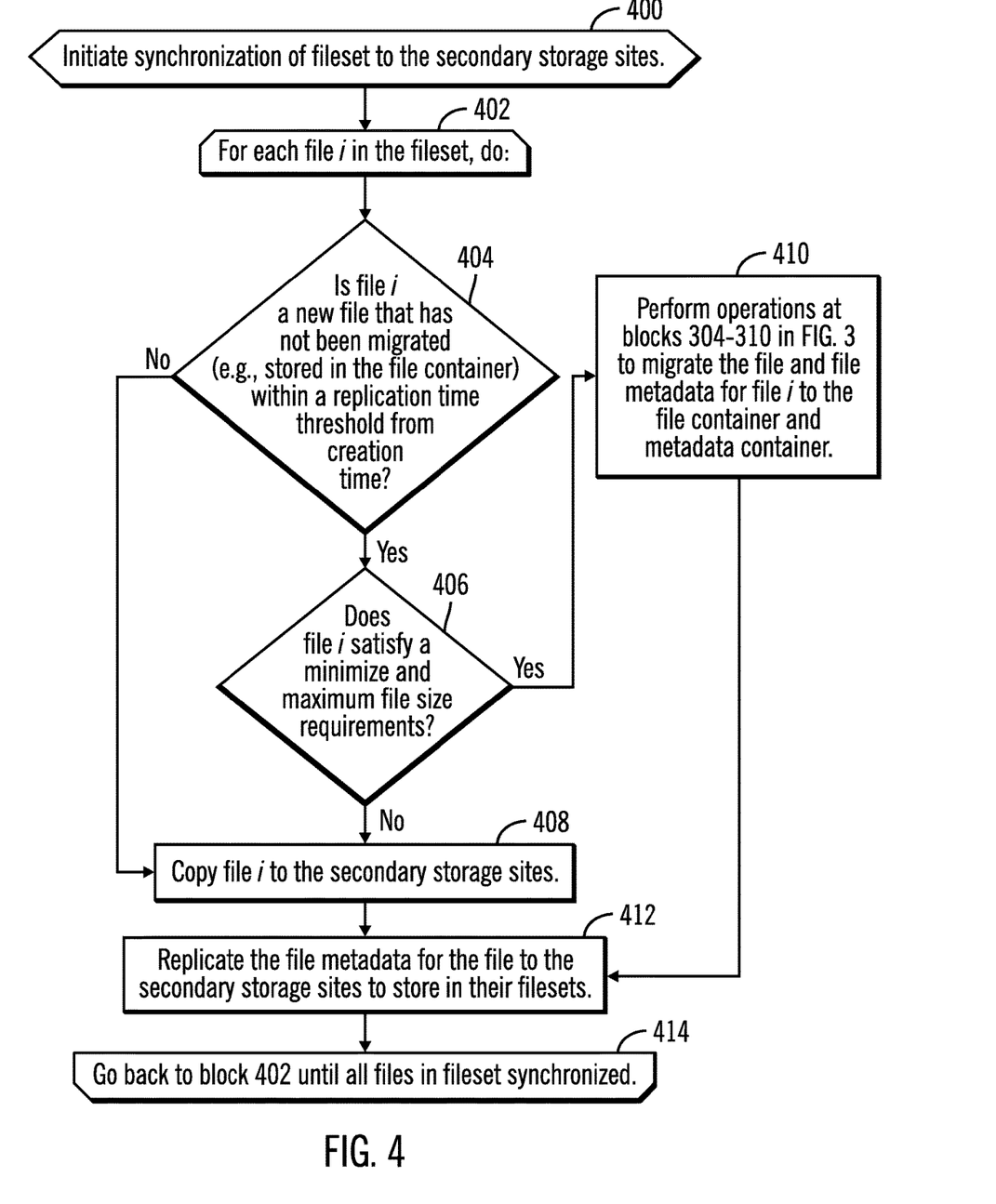
FIG. 4 illustrates an embodiment of operations to synchronize a file set with secondary storage sites.

FIG. 4 illustrates an embodiment of operations performed by the active file manager 114 in the primary storage site 100 to synchronize files in the filesets 112 to the secondary storage sites $102_1 \ldots 102_n$, such as part of an initial synchronization to replicate files. Upon initiating (at block 400) synchronization, the active file manager 114 performs a loop of operations at blocks 402 through 414 for each file i in the fileset 112. At block 404, a determination is made whether file i is a new file that has not been migrated to the file container 126 within a replication time threshold from a time the file was created 212. The replication time threshold may further include a transfer time size factor, such that the determination consider a time since the file was created 212 and a current time and a transfer time size factor. If (at block 404) the new file i has not been replicated within the replication time threshold and the file i satisfies (at block 406) a minimum and maximum file size requirements, i.e., is between the min and max, then the active file manager 114 performs (at block 410) the operations at blocks 304-310 in FIG. 3 to migrate the file i and file metadata $200_i$ for file i to the file container 126 and metadata container 132, respectively.

If (at block 406) the file size requirements are not satisfied or if (at block 404) the file i is not new or is new and has been migrated within the replication time threshold, control proceeds to block 408 where the file i is copied to the secondary storage sites $102_1 \ldots 102_n$. After copying the file i (at block 408) or migrating (at block 410), the file metadata $200_i$ for the file i is replicated (at block 412) to the secondary storage sites $102_1 \ldots 102n$ to store in their filesets 112. From block 412, control proceeds (at block 414) back to block 402 to process a next file until all files are synchronized.

With the operations of FIG. 4, only file metadata 200 is migrated unless the file is a new file that has not been migrated within a replication time threshold from the creation time 212. In such case, if the file has not been migrated in a timely manner, then the file is migrated to the file container 126, from where it is fragmented and distributed to the sites 100, $102_1 \ldots 102_n$. If the file satisfies the size requirements, then the file is not so large as to have a significant negative impact on network 106 performance. This ensures the file is made available to the secondary storage sites $102_1 \ldots 102_n$ within a replication time threshold so that they will be available if there is a disaster requiring failover to one of the secondary storage sites $102_1 \ldots 102_n$.

Figure 5:
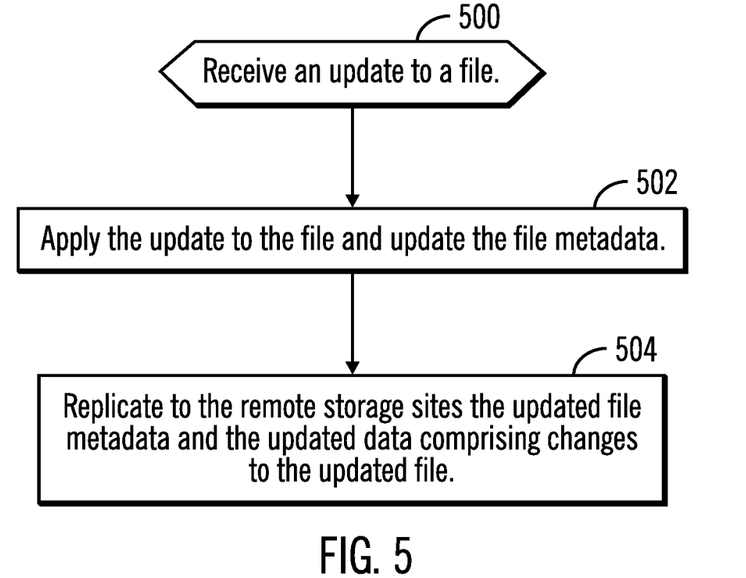
FIG. 5 illustrates an embodiment of operations to process an update to a file at a primary storage site.

FIG. 5 illustrates an embodiment of operations performed by the active file manager 114 to process an update to a file in a fileset 112. Upon receiving an update to a file in a fileset 112, the update is applied (at block 502) to the file and the file metadata 200, is updated, such as updating the last modified time 210, file size 214, etc. The active file manager 114 replicates (at block 504) the updated file metadata 200, and the updated data to the secondary storage sites $102_1 \ldots 102_n$ to store in the fileset 112, where the updated data may include mostly or just changed data, comprising less than all the data of the file unless the entire file is changed. In this way, the transferred data may comprise a small portion or fraction of a very large file. In certain embodiments, after the operations of FIG. 5, the updated file may be resident at the primary 100 and secondary $102_1 \ldots 102_n$ storage sites. In the embodiment of FIG. 5, the updated file is not migrated as an object to the file containers 126 distributed at the primary storage site 100 and the secondary storage sites $102_1 \ldots 102_n$ so as to avoid having a negative impact on network 106 performance due to the large size of the entire updated object, where only a small portion of the object may have been updated. In an alternative embodiment, the entire updated object may be migrated to the file container 126, and then distributed as fragments throughout the network 106.

Figure 6:
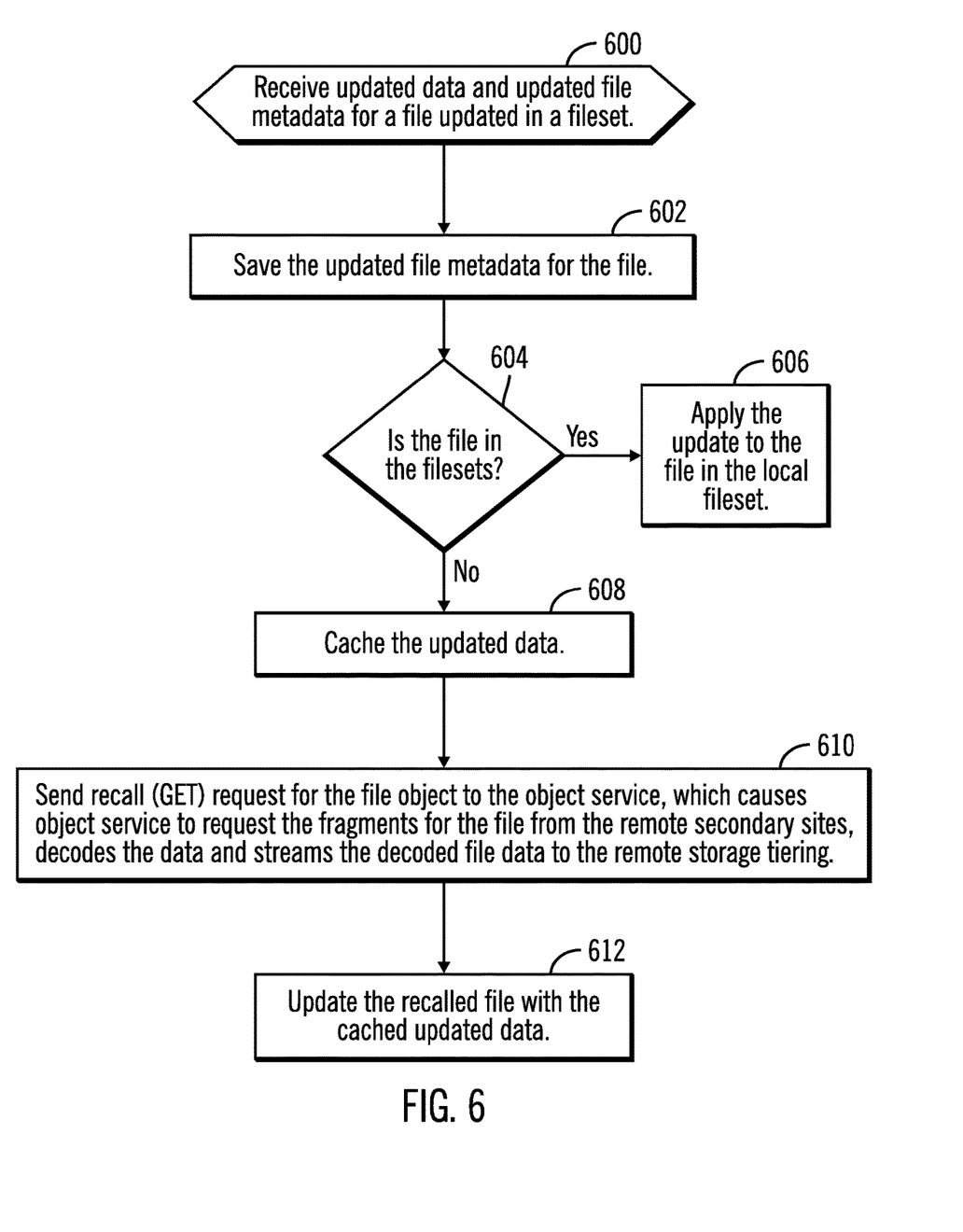
FIG. 6 illustrates an embodiment of operations to process received updated data at a secondary storage site.

FIG. 6 illustrates an embodiment of operations performed at the active file manager 114 at the secondary storage sites $102_1 \ldots 102_n$ to process received updated data and file metadata 200, from the primary storage site 100. Upon receiving (at block 600) the updated data and the updated file metadata for a file updated in a fileset 112, the updated file metadata is stored (at block 602) for the file. If (at block 604) the updated file is stored locally in the filesets 112, then the update is applied (at block 606) to the file in the local fileset 112. If (at block 604) the updated file is not stored locally in a fileset 112, then the updated data is cached (at block 608). A recall (GET) request is sent (at block 610) to the object service 120, which causes the object service 120 to request the fragments 130 for the file from the remote secondary storage sites $102_1 \ldots 102_n$, decodes the data and steams the decoded file data to the remote storage tiering 116 to make available as a fileset 112. The recalled file is then updated (at block 610) with the cached updated data.

Figure 7:
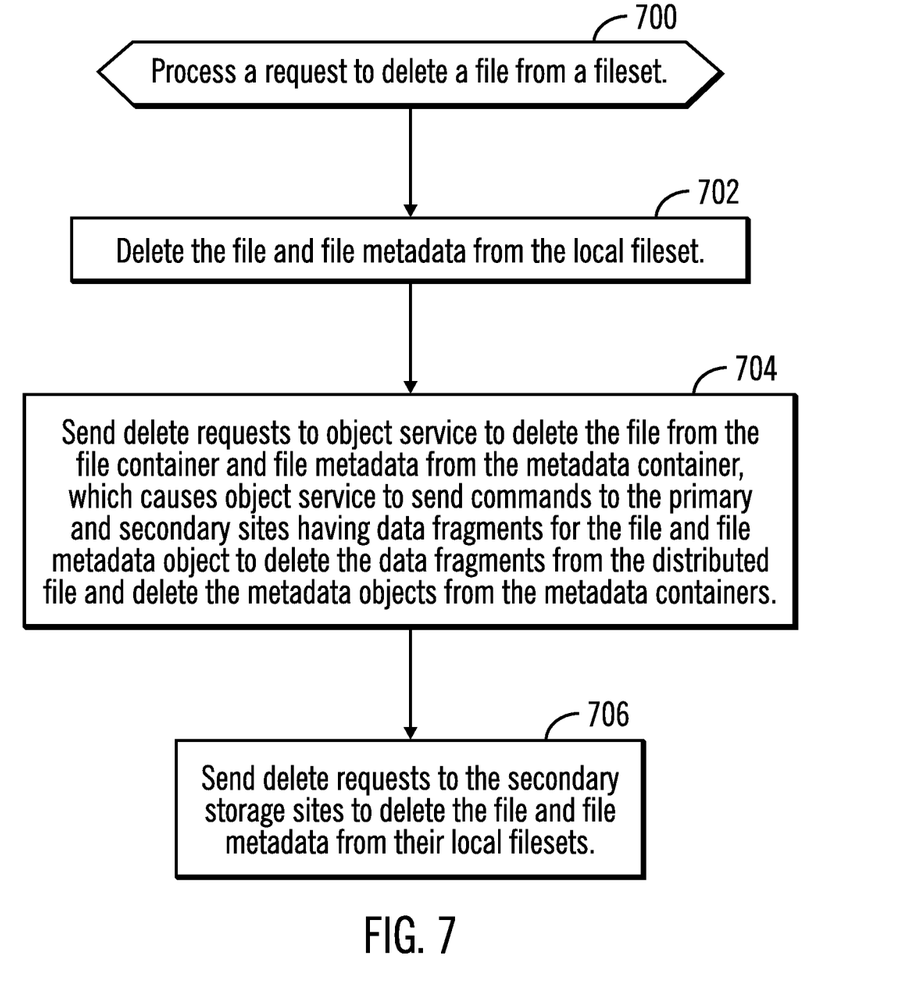
FIG. 7 illustrates an embodiment of operations to process a request to delete a file.

FIG. 7 illustrates an embodiment of operations performed by the active file manager 114 at the primary storage site 100 to process a request to delete a file. Upon receiving (at block 700) a request to delete a file from a fileset 112, the file and file metadata is deleted (at block 702) if stored in the local fileset 112. Delete requests are sent (at block 704) to the object service 120 to delete the file object 128 from the file container 126 and the metadata object 134 from the metadata container 132, which causes the object service 120 to send commands to the containers 126, 132 at the primary 100 and secondary $102_1 \ldots 102_n$ storage sites having file object fragments 130 and a metadata object 134 for the file to delete the fragments 130 and the metadata object 134 for the file from their file 126 and metadata 132 containers. Delete requests are sent (at block 706) to the secondary storage sites $102_1 \ldots 102_n$ to delete the file metadata and the file if resident from their local filesets 112 at the secondary storage sites $102_1 \ldots 102_n$.

With the operations of FIG. 7, deleting a file from a fileset 112 at the primary storage site 100, deletes the file at the primary storage site 100 and at other locations such as the secondary storage sites $102_1 \ldots 102_n$ and the file 126 and metadata 132 containers at the sites 100, $102_1 \ldots 102_n$.

The reference characters used herein, such as i,n are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
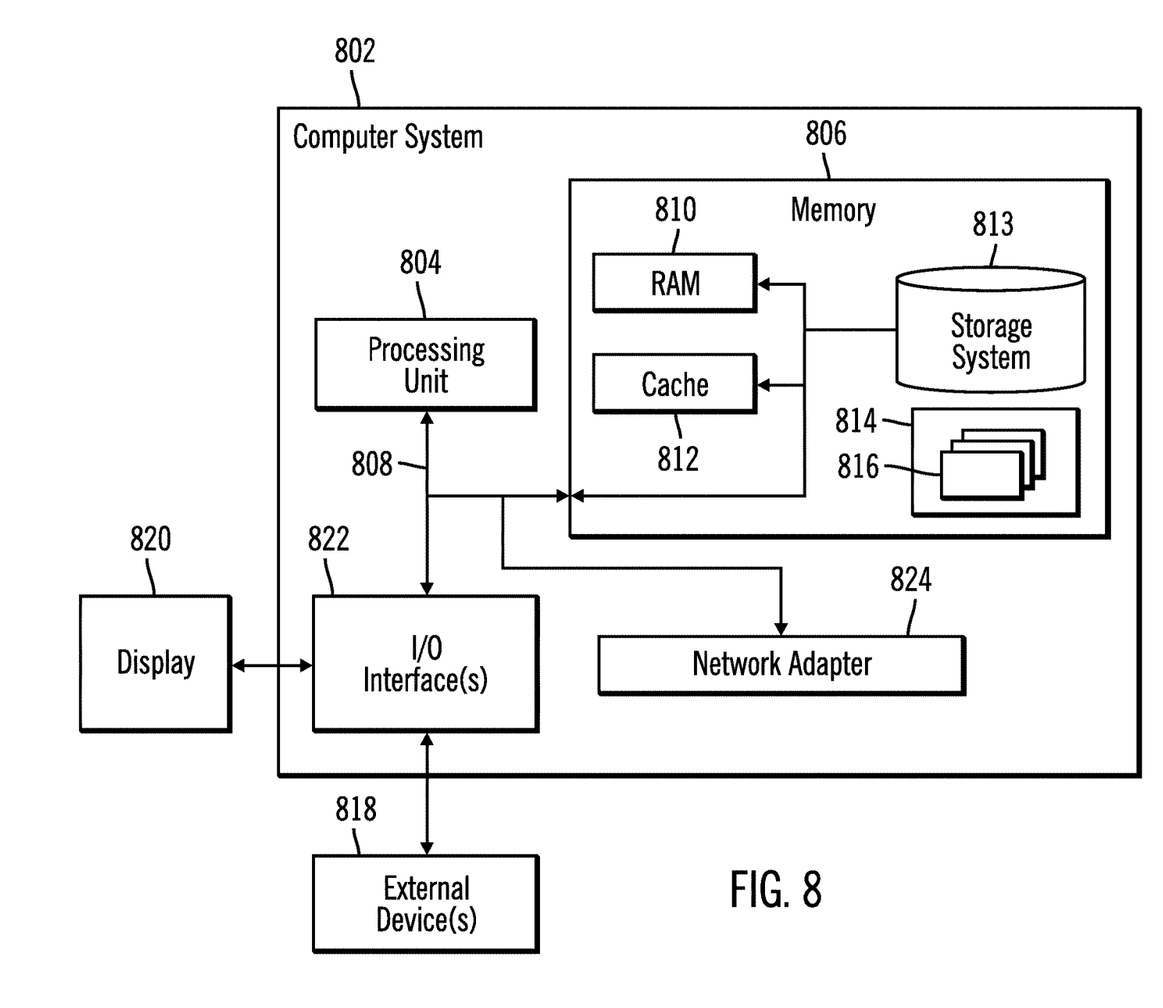
FIG. 8 illustrates a computing environment in which the components of FIG. 1 may be implemented.

The computational components of FIG. 1, including the servers 108, at the primary 100 and secondary 102$_1$ . . . 102$_n$ storage sites may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing files in a fileset at a primary storage site and secondary storage sites over a network, wherein the computer program product comprises a computer readable storage medium having program instructions embodied therewith, the program instructions executable by a processor to cause operations, the operations comprising:

determining a first group of files in a fileset that has not been accessed within a threshold time;

migrating the first group of files in a local storage at the primary storage site to a file container in an object storage over a local network, wherein the primary storage site includes the object storage, local storage, and the local network;

pre-migrating a second group of files in the fileset that have been accessed within the threshold time to the file container while leaving a copy of the files in the second group in the fileset;

encoding data for the first group of migrated files to distribute over the network to the secondary storage sites, wherein the secondary storage sites are at different locations than the primary storage site;

updating file metadata for the first group of migrated files, migrated from the local storage to the file container in the object storage, to include access information to access the migrated files in the file container in the object storage;

deleting data for the first group of migrated files in the local storage; and replicating the updated file metadata for the first group of migrated files to the secondary storage sites over the network to store in filesets at the secondary storage sites without replicating file data for the first group of migrated files previously distributed to the secondary storage sites to store in the filesets at the secondary storage sites.

2. The computer program product of claim 1, wherein the file container is distributed across the primary and the secondary storage sites, and wherein the distributing the data for the first group of files migrated to the file container causes each migrated file of the first group of migrated files to be encoded into fragments and distributed among the secondary storage sites.

3. The computer program product of claim 2, wherein the operations further comprise:

migrating the file metadata for the first group of files migrated to the file container to a metadata container distributed across the primary and the secondary storage sites; and copying a full copy of the file metadata to the metadata container at the secondary storage sites in response to the migrating the file metadata to the metadata container.

4. The compute program product of claim 2, wherein a migrated file of the first group of migrated files is recalled by retrieving the fragments in the file container distributed at the secondary storage sites and then decoding the retrieved fragments to reconstruct the migrated file.

5. The computer program product of claim 1, wherein the operations further comprise:

determining whether a condition is satisfied with respect to the files being migrated; and replicating at least a portion of any of the files satisfying the condition to the secondary storage sites over the network.

6. The computer program product of claim 1, wherein the operations further comprise:

receiving an update to one of the files in the fileset comprising an updated file;

updating file metadata for the updated file to include information on the updated file; and replicating the updated file metadata for the updated file to the secondary storage sites over the network.

7. The computer program product of claim 6, wherein the operations further comprise:

replicating updated data of the updated file to the secondary storage sites over the network, wherein the updated data comprises changes to the updated file that is less than full content of the updated file.

8. The computer program product of claim 7, wherein the replicating the updated data to the secondary storage sites causes a secondary storage site of the secondary storage sites to perform:

updating a previous version of the updated file at the secondary storage site with the updated data when the secondary storage site includes a copy of the updated file;

recalling from the file container the updated file when the secondary storage site does not include a copy of the updated file; and updating the recalled updated file with the updated data.

9. The computer program product of claim 1, wherein the operations further comprise:

determining whether a new file in the fileset, whose file metadata was replicated to the secondary storage sites, has not been migrated to the file container within a replication time threshold; and replicating the new file to the secondary storage sites over the network in response to determining that the new file has not been migrated to the file container within the replication time threshold.

10. The computer program product of claim 1, wherein the operations further comprise:

receiving a delete request to delete a file in the fileset;

deleting the file and the file metadata for the file to delete in the fileset;

sending a delete request to delete the file from the file container, which causes issuance of commands to delete data of the file distributed at the secondary storage sites; and sending a delete request to delete the file metadata from a metadata container, which causes issuance of commands to delete the file metadata at the secondary storage sites.

11. The computer program product of claim 1, wherein the fileset at the primary storage site comprises a read and write fileset, and wherein the secondary storage sites have read-only filesets, and wherein the secondary storage sites comprise disaster recovery sites to use for fileset operations if the primary storage site is unavailable on the network.

12. A system for managing files in a fileset at a primary storage site in communication with a plurality of secondary storage sites over a network, comprising:

a local storage having filesets;

an object storage having a file container a server in communication with the local storage and the object storage over a local network to perform operations comprising:

determining a first group of files in a fileset that has not been accessed within a threshold time;

migrating the first group of files in the local storage to the file container in the object storage over the local network, wherein the primary storage site includes the object storage, local storage, and the local network;

pre-migrating a second group of files in the fileset that have been accessed within the threshold time to the file container while leaving a copy of the files in the second group in the fileset;

encoding data for the first group of migrated files to distribute over the network to the secondary storage sites, wherein the secondary storage sites are at different locations than the primary storage site;

updating file metadata for the first group of migrated files, migrated from the local storage to the file container in the object storage, to include access information to access the migrated files in the file container in the object storage;

deleting data for the first group of migrated files in the local storage; and replicating the updated file metadata for the first group of migrated files to the secondary storage sites over the network to store in filesets at the secondary storage sites without replicating file data for the first group of migrated files previously distributed to the secondary storage sites to store in the filesets at the secondary storage sites.

13. The system of claim 12, wherein the operations further comprise:

migrating the file metadata for the first group of files migrated to the file container to a metadata container at the object storage distributed across the primary and the secondary storage sites; and copying a full copy of the file metadata to the metadata container at the secondary storage sites in response to the migrating the file metadata to the metadata container.

14. The system of claim 12, wherein the operations further comprise:

receiving an update to one of the files in the fileset comprising an updated file;

updating file metadata for the updated file to include information on the updated file; and replicating the updated file metadata for the updated file to the secondary storage sites over the network.

15. The system of claim 14, wherein the operations further comprise:

replicating updated data of the updated file to the secondary storage sites over the network, wherein the updated data comprises changes to the updated file that is less than full content of the updated file.

16. A system for managing files, comprising:
a primary storage site;
a plurality of secondary storage sites that communicate with the primary storage sites over a network;
wherein the primary storage site includes:
a local storage having filesets;
an object storage having a file container
a server in communication with the local storage and the object storage to perform operations comprising:
determining a first group of files in a fileset that has not been accessed within a threshold time;
migrating the first group of files in a fileset of the filesets in the local storage to the file container in an object storage over a local network, wherein the primary storage site includes the object storage, local storage, and the local network;
pre-migrating a second group of files in the fileset that have been accessed within the threshold time to the file container while leaving a copy of the files in the second group in the fileset;

encoding data for the first group of migrated files to distribute over the network to the secondary storage sites, wherein the secondary storage sites are at different locations than the primary storage site;

updating file metadata for the first group of migrated files, migrated from the local storage to the file container in the object storage, to include access information to access the migrated files in the file container in the object storage;

deleting data for the first group of migrated files in local storage; and replicating the updated file metadata for the first group of migrated files to the secondary storage sites over the network to store in filesets at the secondary storage sites without replicating file data for the first group of migrated files previously distributed to the secondary storage sites to store in the filesets at the secondary storage sites.

17. The system of claim 16, further comprising:

migrating the file metadata for the first group of files migrated to the file container to a metadata container distributed across the primary and the secondary storage sites; and copying a full copy of the file metadata to the metadata container at the secondary storage sites in response to the migrating the file metadata to the metadata container.

18. A method for managing files in a fileset at a primary storage site and secondary storage sites over a network, comprising:

determining a first group of files in a fileset that has not been accessed within a threshold time;

migrating the first group of files in a local storage at the primary storage site to a file container in an object storage over a local network, wherein the primary storage site includes the object storage, local storage, and the local network;

encoding data for the first group of migrated files to distribute over the network to the secondary storage sites, wherein the secondary storage sites are at different locations than the primary storage site;

updating file metadata for the first group of migrated files, migrated from the local storage to the file container in the object storage, to include access information to access the migrated files in the file container in the object storage;

deleting data for the first group of migrated files in the local storage; and replicating the updated file metadata for the first group of migrated files to the secondary storage sites over the network to store in filesets at the secondary storage sites without replicating file data for the first group of migrated files previously distributed to the secondary storage sites to store in the filesets at the secondary storage sites.

19. The method of claim 18, further comprising:

migrating the file metadata for the first group of files migrated to the file container to a metadata container distributed across the primary and the secondary storage sites; and copying a full copy of the file metadata to the metadata container at the secondary storage sites in response to the migrating the file metadata to the metadata container.

20. The method of claim 18, further comprising:

receiving an update to one of the files in the fileset comprising an updated file;

updating file metadata for the updated file to include information on the updated file; and replicating the updated file metadata for the updated file to the secondary storage sites over the network.

21. The method of claim 20, further comprising:

replicating updated data of the updated file to the secondary storage sites over the network, wherein the updated data comprises changes to the updated file that is less than full content of the updated file.

* * * * *